(12) United States Patent
Liu

(10) Patent No.: US 9,994,217 B2
(45) Date of Patent: Jun. 12, 2018

(54) VEHICLE REAR WHEEL STEERING ASSIST CONTROL SYSTEM AND CONTROL METHOD THEREFOR

(71) Applicant: YANCHENG INSTITUTE OF TECHNOLOGY, Yancheng, Jiangsu Province (CN)

(72) Inventor: Fuhao Liu, Yancheng (CN)

(73) Assignee: Yancheng Institute of Technology, Yancheng (CN)

( * ) Notice: Subject to any disclaimer, the term of this patent is extended or adjusted under 35 U.S.C. 154(b) by 25 days.

(21) Appl. No.: 15/319,246

(22) PCT Filed: Jan. 12, 2016

(86) PCT No.: PCT/CN2016/070720
§ 371 (c)(1),
(2) Date: Dec. 15, 2016

(87) PCT Pub. No.: WO2016/115994
PCT Pub. Date: Jul. 28, 2016

(65) Prior Publication Data
US 2017/0144653 A1 May 25, 2017

(30) Foreign Application Priority Data
Jan. 19, 2015 (CN) .......................... 2015 1 0026912

(51) Int. Cl.
*B60G 17/018* (2006.01)
*B60W 30/045* (2012.01)
(Continued)

(52) U.S. Cl.
CPC .......... *B60W 30/045* (2013.01); *B60W 10/20* (2013.01); *B60W 10/22* (2013.01);
(Continued)

(58) Field of Classification Search
CPC .... B60W 30/045; B60W 10/20; B60W 10/22; B60W 30/04
(Continued)

(56) References Cited

U.S. PATENT DOCUMENTS 5,099,940 A * 3/1992 Imaseki ................. B62D 7/159
180/415
5,103,925 A * 4/1992 Imaseki ................. B60T 8/1755
180/415
(Continued)

FOREIGN PATENT DOCUMENTS

CN 103832472 6/2014
CN 104709341 6/2015
(Continued)

OTHER PUBLICATIONS

International Search Report filed in PCT/CN2016/070720 dated Apr. 18, 2016.

*Primary Examiner* — Muhammad Shafi
(74) *Attorney, Agent, or Firm* — Rankin, Hill & Clark LLP

(57) ABSTRACT

A vehicle rear wheel steering assist control system is provided where a wheel deflection angle measuring instrument is mounted at a front wheel for measuring a steering angle of the front wheel, a rotational velocity measuring instrument is also mounted at the front wheel for testing a velocity of the front wheel, output ends of the wheel deflection angle measuring instrument and the rotational velocity measuring instrument are electrically connected to the data acquisition module, the data acquisition module is electrically connected to the controller, the controller is electrically connected to a data execution module, the rear wheel active steering device is mounted at a rear wheel of the automobile, the rear wheel active steering device is electrically connected to the data execution module, the controller is elec-
(Continued)

O central rotation angle
θ₁ deflection angle of a left front wheel
θ₂ deflection angle of target rear wheel
θ₆ included angle
V₁ velocity of left front wheel
V₆ velocity of a central point of the automobile
F₆ centripetal force at the centre of gravity of the automobile
r₁ distance between an instantaneous centre and an axis of the left front wheel
ω angular velocity between the central point of the automobile and the central rotation angle
B wheel base
L axle base
a ½ wheel base
b ½ axle base
G standard centre of gravity trically connected to an ECU of the automobile, each automobile seat is provided with a weight sensor, which are electrically connected to the controller.

7 Claims, 3 Drawing Sheets

(51) Int. Cl.
   *B60W 10/22* (2006.01)
   *B60W 10/20* (2006.01)
   *B60W 30/04* (2006.01)
(52) U.S. Cl.
   CPC ....... *B60W 30/04* (2013.01); *B60W 2510/205* (2013.01); *B60W 2540/18* (2013.01); *B60W 2710/207* (2013.01); *B60W 2710/223* (2013.01)

(58) Field of Classification Search
   USPC .......................................................... 701/37
   See application file for complete search history.

(56) References Cited

U.S. PATENT DOCUMENTS

| 2009/0187302 A1* | 7/2009 | Takenaka | B60T 8/1755 |
| | | | 701/33.8 |
| 2009/0319114 A1* | 12/2009 | Takenaka | B60T 8/1755 |
| | | | 701/48 |

FOREIGN PATENT DOCUMENTS

| JP | S60191876 | 9/1985 |
| JP | H03114979 | 5/1991 |
| WO | 95/16600 | 6/1995 |

* cited by examiner automobile turns clockwise a curve of 90° with rear wheel steering assist system rounding a corner by a smaller radius automobile turns clockwise a curve of 90° with rear wheel steering assist system giving assistance to the automobile steering at high velocity known automobile turns clockwise a curve of 90°

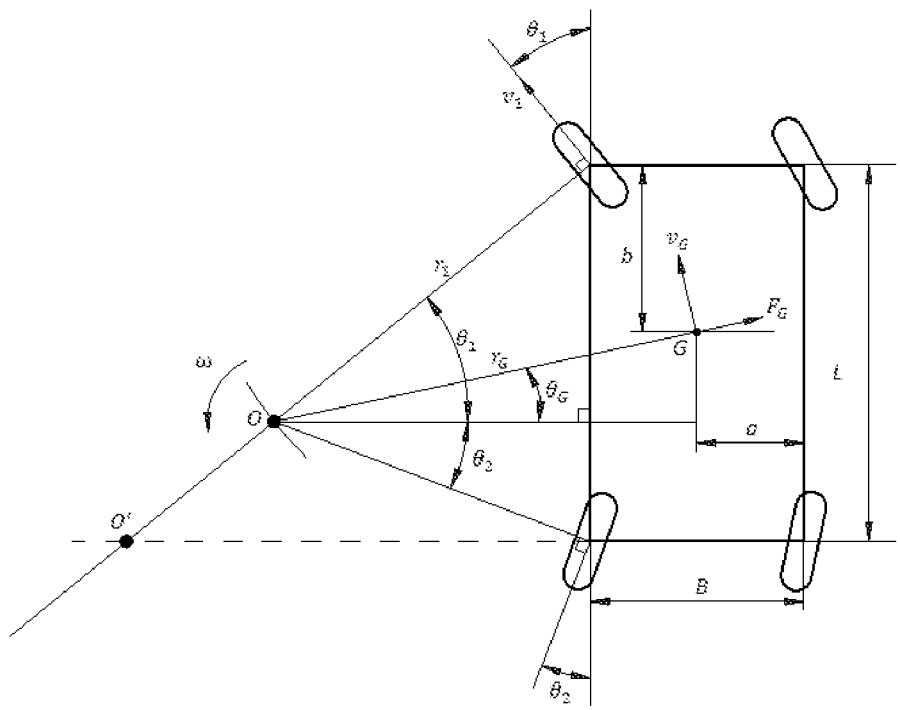

O central rotation angle
Θ₁ deflection angle of a left front wheel
Θ₂ deflection angle of target rear wheel
Θ_G included angle
V₁ velocity of left front wheel
V_G velocity of a central point of the automobile
F_G centripetal force at the centre of gravity of the automobile
r₁ distance between an instantaneous centre and an axis of the left front wheel
ω angular velocity between the central point of the automobile and the central rotation angle
B wheel base
L axle base
a ½ wheel base
b ½ axle base
G standard centre of gravity

Fig. 4

G standard centre of gravity
a ½ wheel base
h preset height data of the centre of gravity

US 9,994,217 B2

VEHICLE REAR WHEEL STEERING ASSIST CONTROL SYSTEM AND CONTROL METHOD THEREFOR

TECHNICAL FIELD

The present invention relates to a vehicle rear wheel steering assist control method and system, and more particularly, to a vehicle rear wheel steering assist control system for an automobile provided with a rear wheel active steering device and a control method therefor.

BACKGROUND

Nowadays, with the development of economy and great improvement of people's living standard, automobiles substantially have gone into thousands of households. The automobile has became a major mode of transportation, and no matter a family automobile or a large freight car and a loading vehicle have occupied half of the transportation industry depending on irreplaceable advantages thereof. With continuous expansion of urbanization, the quantity of family cars is steadily on the increase, which leads to large-area coverage of roads. No matter an ordinary driveway or an overhead driveway has various curves. Usually, a vehicle has a rollover risk at different velocities when rounding a corner because of different cornering radiuses. However, if the vehicle can keep the cornering radius of the automobile in a safety range all the time during cornering, then the automobile may be very safe during cornering. Cornering and turning around are unavoidable during driving, and are difficult to be mastered for those with poor driving skills, and a danger is inevitable due to wrong determination. The cornering radius of the existing vehicle while steering under a low velocity condition such as turning in situ is oversize, which requires a very large space, and is very inconvenient for urban life with heavy traffic. While under a high velocity condition, friction unavoidably occurs to a rear wheel of an ordinary automobile with the guiding of a front wheel while cornering; in this way, the automobile may be unstable during cornering, and operation reliability cannot be guaranteed in case of emergency.

Chinese patent CN201420437339.3 disclosed a rear wheel active steering device and control system thereof on Dec. 3, 2014, comprising a moment amplification device assembly, a rear wheel steering system assembly, a steering knuckle and a wheel system assembly, wherein the steering knuckle is fixed on a motor shaft of a hub motor of the wheel system assembly, a steering pull rod of the steering system assembly is connected to a steering trapezoidal arm of the steering knuckle, and a support at a lower end of the moment amplification device assembly is connected to a steering transmission shaft of the rear wheel steering system assembly. The utility model is applied to an electric automobile independently driving by the hub motor, and the steering moment of the rear wheel may be amplified through the moment amplification device, so as to adapt to an occasion with steering difficulty. Meanwhile, an electric-control unit can assist in steering the rear wheel by adjusting differential of the hub motor of the rear wheel. However, such technology lacks a reasonable control strategy, which leads to relatively poor control safety; moreover, the cornering radius while steering under a low velocity condition such as turning in situ is oversize, which requires a very large space and is very inconvenient for urban life with heavy traffic. While under a high velocity condition, friction unavoidably occurs to a rear wheel of an ordinary automobile with the guiding of a front wheel while cornering; in this way, the automobile may be unstable during cornering, and operation reliability cannot be guaranteed in case of emergency.

SUMMARY

The object of the present invention is to provide a vehicle rear wheel steering assist control system and control method therefor, so as to solve the problems of the current technical solution that the cornering radius while steering under a low velocity condition such as turning in situ is oversize, which requires a very large space and is very inconvenient for urban life with heavy traffic, while under a high velocity condition, friction unavoidably occurs to a rear wheel of an ordinary automobile with the guiding of a front wheel while cornering; in this way, the automobile may be unstable during cornering.

The technical solution adopted by the present invention to solve the technical problem thereof is as follows: a vehicle rear wheel steering assist control system applied to an automobile provided with a rear wheel active steering device and powered up by a power supply of the automobile includes a controller, a data execution module, a data acquisition module, a rear wheel active steering device, a wheel deflection angle measuring instrument and a rotational velocity measuring instrument, wherein the wheel deflection angle measuring instrument is mounted at a front wheel for measuring a steering angle of the front wheel, the rotational velocity measuring instrument is also mounted at the front wheel for testing a velocity of the front wheel, output ends of the wheel deflection angle measuring instrument and the rotational velocity measuring instrument are electrically connected to the data acquisition module, the data acquisition module is electrically connected to the controller, the controller is electrically connected to a control end of the data execution module, the rear wheel active steering device is mounted at a rear wheel of the automobile, a control end of the rear wheel active steering device is electrically connected to an output end of the data execution module, the controller is electrically connected to an ECU of the automobile, each automobile seat is internally provided with a weight sensor, and the weight sensors are electrically connected to the controller. According to the setting of the present invention, the rear wheel active steering device of the automobile provided with the rear wheel steering assist system is operated under a low velocity, and the rear wheel of the automobile is reverse to the front wheel of the automobile after rotating by the angle θ, so that the automobile can round a corner by a smaller radius, and the rear wheel steering assist system assists in steering the automobile under the condition of driving at a high velocity, so that the rear wheel can also be in pure rolling, which enables the automobile to be more stable and reliable during cornering.

Preferably, the data execution module is electrically connected to a control end of an initiation airbag, and four initiation airbags are provided, wherein two of the initiation airbags are arranged between an automobile frame and a front axle, and the other two are arranged between the automobile frame and a rear axle.

Preferably, the controller is a single chip.

Preferably, a multiple adjusting button is further included, wherein the multiple adjusting button is electrically connected to the controller, and the multiple adjusting button is arranged on a control panel of the automobile.

A vehicle rear wheel steering assist control method applied to a vehicle rear wheel steering assist control system according to claim 4 includes the following steps:

step I, manually setting existing parameters that include a wheel base B and an axle base L, a net weight M of an automobile body, and a standard centre of gravity G of the automobile body, the standard centre of gravity G of the automobile body being composed of half wheel base data a and preset height data of the centre of gravity h;

step II, obtaining a deflection angle $\theta_1$ of a left wheel of the automobile and a velocity $v_1$ of a left front wheel by the vehicle rear wheel steering assist control system during cornering, obtaining a weight m of the automobile according to the net weight M of the automobile body and a sum of numerical values of all weight sensors by the vehicle rear wheel steering assist control system, a distance $r_1$ between an instantaneous centre and an axis of the left front wheel being a target calculated value, and reading a preset minimum cornering radius $r_0$ and a preset safe wheel rotational velocity $v_0$ in the meanwhile; if $v_0 > v_0$, then stopping the operation of the rear wheel active steering device in the vehicle rear wheel steering assist control system, and the rear wheel of the automobile being in pure rolling, and if $v_1 \leq v_0$, then performing step III;

step III, calculating, by the controller, a centripetal force moment $T_G$ according to the existing parameters and a following formula:

$$T_G = mh[r_1 \cos(\theta_1) + (B-a)]\left(\frac{v_1}{r_1}\right)^2,$$

wherein, since $T_G = T_{Gravity}$ is obtained through moment equilibrium, a following algorithm is obtained:

$$mga = mh[r_1 \cos(\theta_1) + (B-a)]\left(\frac{v_1}{r_1}\right)^2,$$

therefore, a following algorithm is obtained:

$$r_1 = \frac{\cos(\theta_1) + \sqrt{\cos(\theta_1)^2 - 4ga(a-B)/v_1^2}}{2ga/v_1^2},$$

obtaining the distance $r_1$ between the instantaneous centre and the axis of the left front wheel; if $r_1 < r_0$, then stopping the operation of the rear wheel active steering device in the vehicle rear wheel steering assist control system, and if $r_1 \geq r_0$, then performing step IV;

step IV, calculating a target deflection angle $\theta_2$ of the rear wheel according to all the parameters above, $$\theta_2 = \tan^{-1}\left(\frac{L - r_1 \sin(\theta_1)}{r_1 \cos(\theta_1)}\right);$$

and step V, obtaining a final deflection angle $\theta$ of the rear wheel after multiplying target deflection angle $\theta_2$ of the rear wheel by an adjustment multiple, outputting the final deflection angle $\theta$ to the rear wheel active steering device, and operating the rear wheel active steering device, the rear wheel of the automobile being reverse to the front wheel of the automobile after rotating by the angle $\theta$.

Preferably, in step II, if $v_1$ is greater than 1.5 times of $v_0$ and 1.5 times of $r_1$ is smaller than $r_0$, then the controller outputs a control signal to the initiation airbag at a steering side, and the initiation airbag at the steering side is initiated. According to the setting of the present invention, initiating the initiation airbag may play a role of assisting in position correction. The system of the present invention can automatically and accurately determine a real time working state of the automobile, so as to adopt a proper coping method.

Preferably, the adjustment multiple in the step V is an adjustment multiple obtained by the control through inputting according to the multiple adjusting button.

The present invention has substantial effects that: according to the setting of the present invention, the rear wheel active steering device of the automobile provided with the rear wheel steering assist system is operated under a low velocity, and the rear wheel of the automobile is reverse to the front wheel of the automobile after rotating by the angle $\theta$, so that the automobile can round a corner by a smaller radius, and the rear wheel steering assist system assists in steering the automobile under the condition of driving at a high velocity, so that the rear wheel can also be in pure rolling, which enables the automobile to be more stable and reliable during cornering. After being provided with the present invention and using the method of the present invention, the automobile is especially suitable for rounding a big corner on the road, and parking in and driving out from a small and narrow space, and a safe wheel rotational velocity facility is preset in the present invention, so that the system of the present invention can automatically and accurately determine the real time working state of the automobile, so as to adopt a proper coping method, and the safety of the automobile is also improved greatly.

BRIEF DESCRIPTION OF THE DRAWINGS

FIG. 4 is a block diagram illustrating a centre of an automobile; and

DETAILED DESCRIPTION

Figure 1:
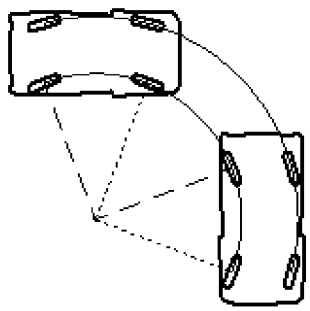
FIG. 1 is an indicating diagram illustrating low velocity turning of an automobile provided with the present invention.

The technical solutions of the present invention are further described in details hereunder with reference to the specific embodiments and drawings.

Embodiment 1:

A vehicle rear wheel steering assist control system (refer to FIGS. 1 to 5) applied to an automobile provided with a rear wheel active steering device and powered up by a power supply of the automobile includes a controller, a data execution module, a data acquisition module, a rear wheel active steering device, a wheel deflection angle measuring instrument and a rotational velocity measuring instrument, wherein the wheel deflection angle measuring instrument is mounted at a front wheel for measuring a steering angle of the front wheel, the rotational velocity measuring instrument is also mounted at the front wheel for testing a velocity of the front wheel, output ends of the wheel deflection angle measuring instrument and the rotational velocity measuring instrument are electrically connected to the data acquisition module, the data acquisition module is electrically connected to the controller, the controller is electrically connected to a control end of the data execution module, the rear wheel active steering device is mounted at a rear wheel of the automobile, a control end of the rear wheel active steering device is electrically connected to an output end of the data execution module, the controller is electrically connected to an ECU of the automobile, each automobile seat is internally provided with a weight sensor, and the weight sensors are electrically connected to the controller. Two initiation airbags are arranged between an automobile frame and a front axle, two initiation airbags are also arranged between the automobile frame and a rear axle, and control ends of the four initiation airbags are all electrically connected to the data execution module. The controller is a single chip. A multiple adjusting button is further included, wherein the multiple adjusting button is electrically connected to the controller, and the multiple adjusting button is arranged on a control panel of the automobile.

A vehicle rear wheel steering assist control method applied to the vehicle rear wheel steering assist control system according to claim 4 includes the following steps of: step I, manually setting existing parameters that include a wheel base B and an axle base L, a net weight M of an automobile body, and a standard centre of gravity G of the automobile body, the standard centre of gravity G of the automobile body being composed of half wheel base data a and preset height data of the centre of gravity h;
step II, obtaining a deflection angle $\theta_1$ of a left wheel of the automobile and a velocity $v_1$ of a left front wheel by the vehicle rear wheel steering assist control system during cornering, obtaining a weight m of the automobile according to the net weight M of the automobile body and a sum of numerical values of all weight sensors by the vehicle rear wheel steering assist control system, a distance $r_1$ between an instantaneous centre and an axis of the left front wheel being a target calculated value, and reading a preset minimum cornering radius $r_0$ and a preset safe wheel rotational velocity $v_0$ in the meanwhile; if $v_1 > v_0$, then stopping the operation of the rear wheel active steering device in the vehicle rear wheel steering assist control system, and the rear wheel of the automobile being in pure rolling, and if $v_1 \leq v_0$, then performing step III;
through a centripetal force $F_G$ at the centre of gravity of the automobile:

$$F_G = m\frac{v_G^2}{r_G} = mr_G\omega^2,$$

the centripetal force moment of the automobile in a direction of the automobile axle being:

$$T_G = mhr_G\omega^2\cos(\theta_G) = mh[r_1\cos(\theta_1) + (B-a)]\left(\frac{v_1}{r_1}\right)^2,$$

deducting out step III, wherein $v_g$, $r_g$, $\theta_g$ and $\omega$ are respectively a velocity of a central point of the automobile, a deflection angle of the central point of the automobile, an included angle and an angular velocity between the central point of the automobile and a central rotation angle O;
step III, calculating, by the controller, the centripetal force moment $T_G$ according to the existing parameters and a following formula:

$$T_G = mh[r_1\cos(\theta_1) + (B-a)]\left(\frac{v_1}{r_1}\right)^2,$$

wherein, since $T_G = T_{Gravity}$ is obtained through moment equilibrium, a following algorithm is obtained:

$$mga = mh[r_1\cos(\theta_1) + (B-a)]\left(\frac{v_1}{r_1}\right)^2,$$

therefore, a following algorithm is obtained:

$$r_1 = \frac{\cos(\theta_1) + \sqrt{\cos(\theta_1)^2 - 4ga(a-B)/v_1^2}}{2ga/v_1^2},$$

obtaining the distance $r_1$ between the instantaneous centre and the axis of the left front wheel; if $r_1 < r_0$, then stopping the operation of the rear wheel active steering device in the vehicle rear wheel steering assist control system, and if $r_1 \geq r_0$, then performing step IV;
step IV, calculating a deflection angle $\theta_2$ of a target rear wheel according to all the parameters above $$\theta_2 = \tan^{-1}\left(\frac{L - r_1\sin(\theta_1)}{r_1\cos(\theta_1)}\right);$$

and
step V, obtaining a final deflection angle $\theta$ of the rear wheel after multiplying target deflection angle $\theta_2$ of the rear wheel by an adjustment multiple, outputting the final deflection angle $\theta$ to the rear wheel active steering device, and operating the rear wheel active steering device, the rear wheel of the automobile being reverse to the front wheel of the automobile after rotating by the angle $\theta$.

In step II, if $v_1$ is greater than 1.5 times of $v_0$ and 1.5 times of $r_1$ is smaller than $r_0$, then the controller outputs a control signal to the initiation airbag at a steering side, and the initiation airbag at the steering side is initiated.

The adjustment multiple in the step V is an adjustment multiple obtained by the control through inputting according to the multiple adjusting button.

Figure 2:
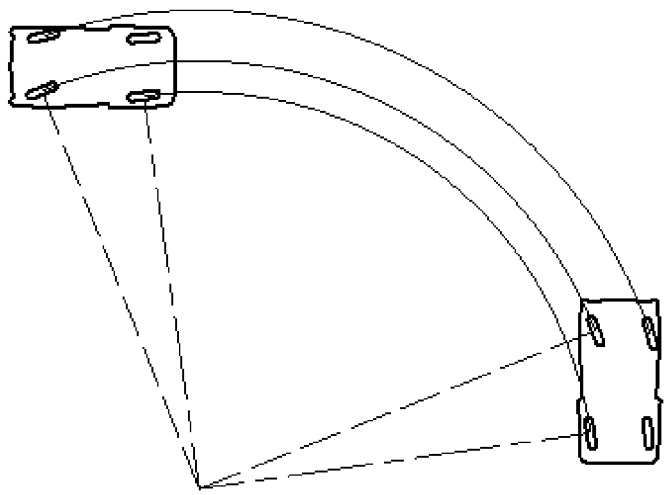
FIG. 2 is an indicating diagram illustrating high velocity turning of an automobile provided with the present invention.
Figure 3:
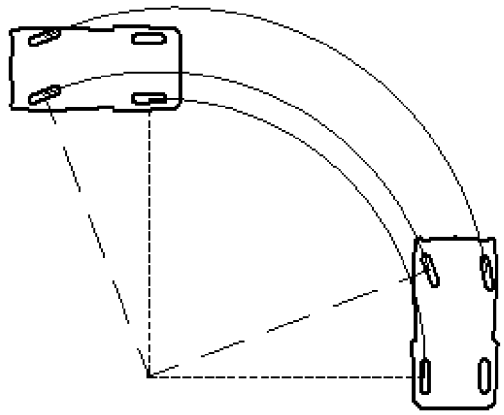
FIG. 3 is an indicating diagram illustrating low velocity turning of an automobile not provided with the present invention.
Figure 5:
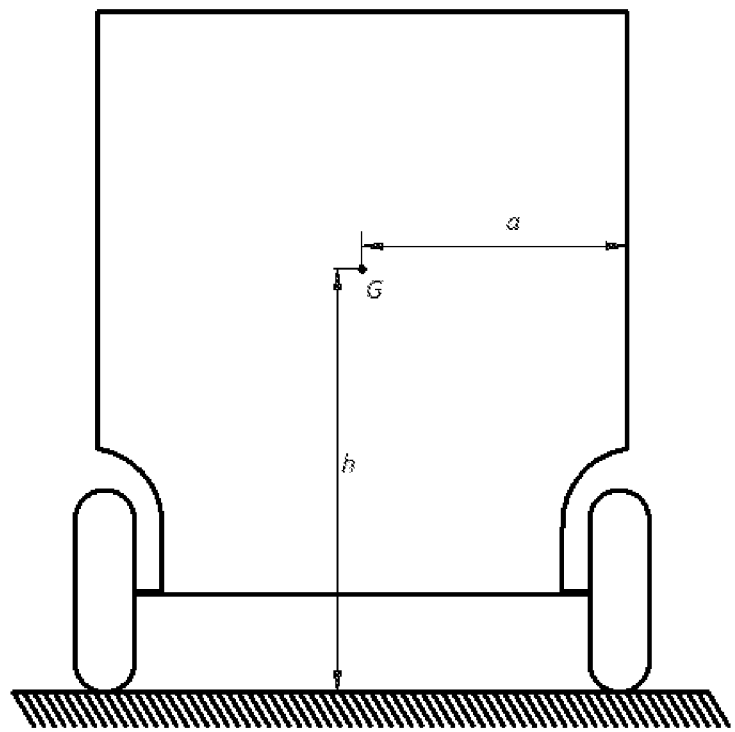
FIG. 5 is a mechanical analysis diagram of the present invention.

According to the setting of the embodiment, FIG. 3 illustrates the condition that the ordinary automobile turns a curve of 90°, and FIG. 1 is the automobile provided with the rear wheel steering assist system that can round a corner by a smaller radius, and in FIG. 2, the rear wheel steering assist system gives an assistance to the automobile steering under the condition of driving at high velocity, so that the rear wheel can also simply roll, which can make the automobile be stable and reliable during cornering.

The above only describes a preferred embodiment of the invention, and is not intended to limit the invention in any way. Other amendments and modifications without departing from the technical solution recorded in the claims may also be made.

The invention claimed is:
1. A vehicle rear wheel steering assist control system applied to an automobile provided with a rear wheel active steering device and powered by a power supply of the automobile, comprising a controller, a data execution module, a data acquisition module, a rear wheel active steering device, a wheel deflection angle measuring instrument and a rotational velocity measuring instrument, wherein the wheel deflection angle measuring instrument is mounted at a front wheel for measuring a steering angle of the front wheel, the rotational velocity measuring instrument is also mounted at the front wheel for testing a velocity of the front wheel, output ends of the wheel deflection angle measuring instrument and the rotational velocity measuring instrument are electrically connected to the data acquisition module, the data acquisition module is electrically connected to the controller, the controller is electrically connected to a control end of the data execution module, the rear wheel active steering device is mounted at a rear wheel of the automobile, a control end of the rear wheel active steering device is electrically connected to an output end of the data execution module, the controller is electrically connected to an ECU of the automobile, each automobile seat is internally provided with a weight sensor, and the weight sensors are electrically connected to the controller.

2. The vehicle rear wheel steering assist control system according to claim 1, wherein the data execution module is connected to a control endpoint of an initiation airbag, and four initiation airbags are provided, wherein two of the initiation airbags are arranged between an automobile frame and a front axle, and the other two are arranged between the automobile frame and a rear axle.

3. The vehicle rear wheel steering assist control system according to claim 2, wherein the controller is a single chip.

4. The vehicle rear wheel steering assist control system according to claim 2, further comprising a multiple adjusting button, wherein the multiple adjusting button is electrically connected to the controller, and the multiple adjusting button is arranged on a control panel of the automobile.

5. A vehicle rear wheel steering assist control method applied to a vehicle rear wheel steering assist control system comprising a controller, a data execution module, a data acquisition module, a rear wheel active steering device, a wheel deflection angle measuring instrument and a rotational velocity measuring instrument, wherein the wheel deflection angle measuring instrument is mounted at a front wheel for measuring a steering angle of the front wheel, the rotational velocity measuring instrument is also mounted at the front wheel for testing a velocity of the front wheel, output ends of the wheel deflection angle measuring instrument and the rotational velocity measuring instrument are electrically connected to the data acquisition module, the data acquisition module is electrically connected to the controller, the controller is electrically connected to a control end of the data execution module, the rear wheel active steering device is mounted at a rear wheel of the automobile, a control end of the rear wheel active steering device is electrically connected to an output end of the data execution module, the controller is electrically connected to an ECU of the automobile, each automobile seat is internally provided with a weight sensor, and the weight sensors are electrically connected to the controller, wherein the data execution module is connected to a control endpoint of an initiation airbag, and four initiation airbags are provided, wherein two of the initiation airbags are arranged between an automobile frame and a front axle, and the other two are arranged between the automobile frame and a rear axle, and further comprising a multiple adjusting button, wherein the multiple adjusting button is electrically connected to the controller, and the multiple adjusting button is arranged on a control panel of the automobile, the method comprising comprising:

step I, manually setting existing parameters that comprise a wheel base B and an axle base L, a net weight M of an automobile body, and a standard center of gravity G of the automobile body, the standard center of gravity G of the automobile body being composed of half wheel base data a and preset height data of the center of gravity h;

step II, obtaining a deflection angle $\theta_1$ of a left wheel of the automobile and a velocity $v_1$ of a left front wheel by the vehicle rear wheel steering assist control system during cornering, obtaining a weight m of the automobile according to the net weight M of the automobile body and a sum of numerical values of all weight sensors by the vehicle rear wheel steering assist control system, a distance $r_1$ between an instantaneous center and an axis of the left front wheel being a target calculated value, and reading a preset minimum cornering radius $r_0$ and a preset safe wheel rotational velocity $v_0$ in the meanwhile; if $v_1 > v_0$, then stopping the operation of the rear wheel active steering device in the vehicle rear wheel steering assist control system, and the rear wheel of the automobile being in pure rolling, and if $v_1 \leq v_0$, then performing step III;

step III, calculating, by the controller, a centripetal force moment $T_G$ according to the existing parameters and a following formula:

$$T_G = mh[r_1\cos(\theta_1) + (B-a)]\left(\frac{v_1}{r_1}\right)^2,$$

wherein, since $T^G = T^{Gravity}$ is obtained through moment equilibrium, a following algorithm is obtained:

$$mga = mh[r_1\cos(\theta_1) + (B-a)]\left(\frac{v_1}{r_1}\right)^2,$$

therefore, a following algorithm is obtained:

$$r_1 = \frac{\cos(\theta_1) + \sqrt{\cos(\theta_1)^2 - 4ga(a-B)/v_1^2}}{2ga/v_1^2},$$

obtaining the distance $r^1$ between the instantaneous center and the axis of the left front wheel; if $r_1 < r_0$, then stopping the operation of the rear wheel active steering device in the vehicle rear wheel steering assist control system, and if $r_1 \geq r_0$, then performing step IV;

step IV, calculating a target deflection angle $\theta_2$ of the rear wheel according to all the parameters above, $$\theta_2 = \tan^{-1}\left(\frac{L - r_1\sin(\theta_1)}{r_1\cos(\theta_1)}\right);$$

and step V, obtaining a final deflection angle $\theta$ of the rear wheel after multiplying target deflection angle $\theta_2$ of the rear wheel by an adjustment multiple, outputting the final deflection angle $\theta$ to the rear wheel active steering device, and operating the rear wheel active steering device, the rear wheel of the automobile being reverse to the front wheel of the automobile after rotating by the angle $\theta$.

6. The vehicle rear wheel steering assist control method according to claim 5, wherein in step II, if $v_1$ is greater than 1.5 times of $v_0$ and 1.5 times of $r_1$ is smaller than $r_0$, then the controller outputs a control signal to the initiation airbag at a steering side, and the initiation airbag at the steering side is initiated.

7. The vehicle rear wheel steering assist control method according to claim 5, wherein the adjustment multiple in the step V is an adjustment multiple obtained by the control through inputting according to the multiple adjusting button.

* * * * *